(12) United States Patent
Wagner et al.

(10) Patent No.: US 11,318,712 B2
(45) Date of Patent: May 3, 2022

(54) SPUNBOND LAMINATE

(71) Applicants: Tobias Wagner, Cologne (DE); Sebastian Sommer, Troisdorf (DE); Patrick Bohl, Hennef (DE); Andreas Roesner, Bonn (DE); Hans-Georg Geus, Niederkassel (DE); Gerold Linke, Hennef (DE); Bernd Kunze, Siegburg (DE)

(72) Inventors: Tobias Wagner, Cologne (DE); Sebastian Sommer, Troisdorf (DE); Patrick Bohl, Hennef (DE); Andreas Roesner, Bonn (DE); Hans-Georg Geus, Niederkassel (DE); Gerold Linke, Hennef (DE); Bernd Kunze, Siegburg (DE)

(73) Assignee: REIFENHAEUSER GMBH & CO. KG MASCHINENFABRIK, Troisdorf (DE)

( * ) Notice: Subject to any disclaimer, the term of this patent is extended or adjusted under 35 U.S.C. 154(b) by 0 days.

(21) Appl. No.: 16/940,926

(22) Filed: Jul. 28, 2020

(65) Prior Publication Data

US 2021/0031487 A1 Feb. 4, 2021

(30) Foreign Application Priority Data

Jul. 30, 2019 (EP) ..................... 19189238

(51) Int. Cl.
*B32B 5/26* (2006.01)
*B32B 5/02* (2006.01)
(Continued)

(52) U.S. Cl.
CPC ................ *B32B 5/26* (2013.01); *B32B 5/022* (2013.01); *D04H 3/007* (2013.01); *D04H 3/16* (2013.01);
(Continued)

(58) Field of Classification Search
CPC ... B32B 5/26; B32B 5/022; B32B 2262/0253; B32B 2262/0276; B32B 2262/12; B32B 2262/124
See application file for complete search history.

(56) References Cited

U.S. PATENT DOCUMENTS 6,454,989 B1 * 9/2002 Neely ...................... D04H 3/16
264/555
2006/0141886 A1 * 6/2006 Brock ...................... B32B 5/08
442/382

(Continued)

*Primary Examiner* — Joanna Pleszczynska
(74) *Attorney, Agent, or Firm* — Andrew Wilford

(57) ABSTRACT

A spunbond nonwoven laminate has a first spunbond nonwoven layer having crimped filaments formed by a first component on an outer surface of the filaments of the first layer consisting or substantially consisting of a polyolefin and a second component consisting or substantially consisting of a plastic having a higher melting point than the polyolefin of the first component of the filaments of the first layer. A second outermost spunbond nonwoven layer on the first layer having filaments as a cover layer and formed by a first component on an outer surface of the filaments of the second layer consisting or substantially consisting of a polyolefin, and a second component consisting or substantially consisting of a plastic having a higher melting point than the polyolefin of the first component of the filaments of the second layer.

22 Claims, 2 Drawing Sheets

(51) Int. Cl.
*D04H 3/007* (2012.01)
*D04H 3/16* (2006.01)
(52) U.S. Cl.
CPC ............... *B32B 2262/0253* (2013.01); *B32B 2262/0276* (2013.01); *B32B 2262/12* (2013.01); *D10B 2321/022* (2013.01); *D10B 2331/04* (2013.01)

(56) References Cited

U.S. PATENT DOCUMENTS

| | | | |
|---|---|---|---|
| 2006/0205308 A1* | 9/2006 | Kihara | D01F 8/06 442/336 |
| 2015/0173975 A1* | 6/2015 | Harumoto | D04H 1/43918 604/370 |
| 2016/0221300 A1* | 8/2016 | Sommer | B32B 5/08 |
| 2019/0136426 A1* | 5/2019 | Hansen | D04H 1/43828 |

* cited by examiner

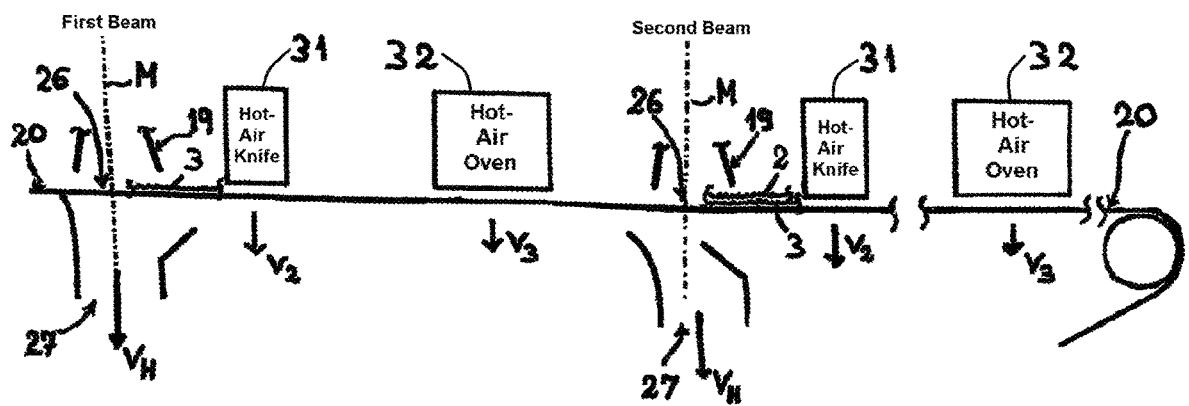
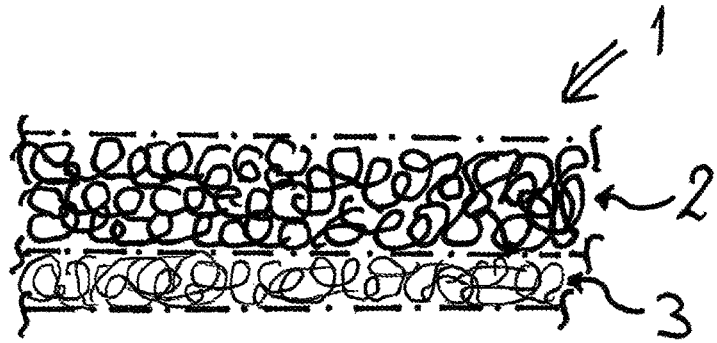
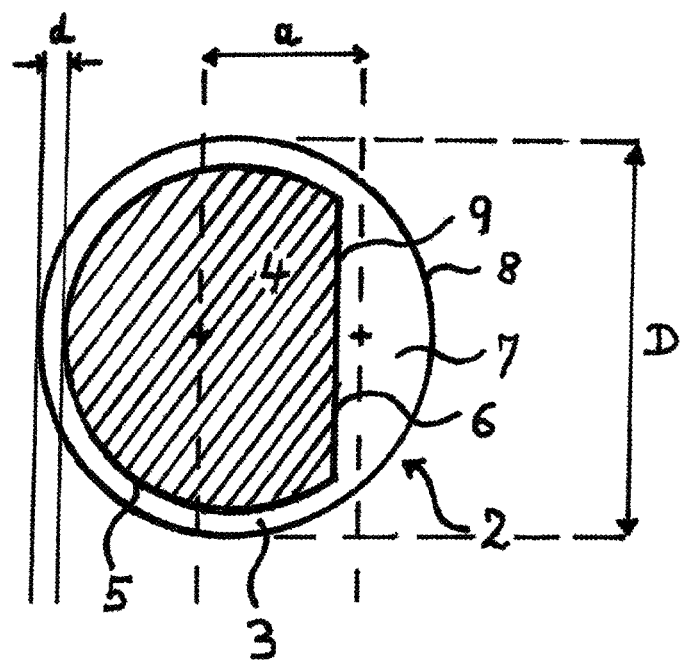

SPUNBOND LAMINATE

FIELD OF THE INVENTION

The invention relates to a spunbond nonwoven laminate having a plurality of spunbond nonwoven layers one atop the other, at least two of the spunbond nonwoven layers having crimped continuous filaments or consisting or consisting substantially of crimped continuous filaments.

The invention further relates to a method of making such a spunbond nonwoven laminate. Due to their quasi-endless length, continuous filaments differ from staple fibers that have significantly shorter lengths of, for example, 10 mm to 60 mm.

BACKGROUND OF THE INVENTION

Spunbond nonwoven laminates of the above-described type are known from the prior art and from practice in various design variants. For many applications, nonwoven fabrics having considerable thickness and having a high degree of softness are required. Considerable thickness is usually achieved by using crimped filaments. In particular, multicomponent or bicomponent filaments with side-by-side configuration or with eccentric core-sheath configuration are used for this. The characteristics of high thickness and high softness are usually associated with a relatively low strength of the nonwoven fabric. On the one hand, this applies to the tensile strength of the nonwoven fabric in the machine direction (MD). On the other hand, this also applies in particular to the abrasion resistance of the nonwoven surface. In this regard, an increase in thickness and softness often adversely affects the abrasion properties of the nonwoven fabrics. Therefore there is a conflict of goals. So far, the solution has presented the person skilled in the art with problems. In addition to a high resistance of the nonwoven fabrics or the nonwoven fabric surface to abrasive stresses, the greatest possible opacity of the nonwoven fabrics is often desirable. Many of the nonwoven fabrics or nonwoven laminates known from the prior art also do not meet this requirement.

OBJECT OF THE INVENTION

The object of the invention is to provide a spunbond nonwoven laminate of the type described above, which is distinguished on the one hand by considerable thickness and a high degree of softness and on the other hand also has optimum strength and, above all, has a high abrasion resistance or a high resistance to abrasive stress. The spunbond nonwoven laminate should also have very good opacity. Another object of the invention is to provide a method of making such a spunbond nonwoven laminate.

SUMMARY OF THE INVENTION

To attain these objects, the invention is a spunbond nonwoven laminate having a plurality of spunbond nonwoven layers one atop the other, at least two of the spunbond nonwoven layers with crimped continuous filaments consisting or substantially consisting of crimped continuous filaments, wherein a first spunbond nonwoven layer having crimped multicomponent filaments or crimped bicomponent filaments is provided formed by a first component on the outer surface of the filaments of the first layer consisting or substantially consisting of at least one polyolefin, in particular of polyethylene, and a second component of the filaments of the first layer consisting or substantially consisting of a plastic having a higher melting point than the polyolefin or polyethylene of the first component of the filaments of the first layer, the spunbond nonwoven laminate has a second outermost spunbond nonwoven layer having multicomponent or bicomponent filaments, particularly having crimped multicomponent or bicomponent filaments as a cover layer and formed by a first component made of at least one polyolefin, in particular polyethylene, on the outer surface of the filaments of the second layer, consisting or substantially consisting of polyethylene and a second component of the filaments of the second layer consisting or substantially consisting of a plastic having a higher melting point than the polyolefin or polyethylene of the first component of the filaments of the second layer, the polyolefin portion or polyethylene portion of the first component of the filaments of the second layer being higher than the polyolefin portion or polyethylene portion of the first component of the filaments of the first layer.

If "substantially consists" is specified here or below relative to a plastic or relative to a polymer, this means in particular that the polymer is present in at least 95% by weight, preferably at least 97% by weight, and preferably also at least 98% by weight. The remaining % by weight can be formed in particular by additives such as plasticizers, fillers, colorants, and the like.

According to the invention, the spunbond nonwoven laminate has at least two spunbond nonwoven layers having crimped continuous filaments. According to a recommended embodiment of the invention, a maximum of four spunbond nonwoven layers having crimped continuous filaments are present in the spunbond nonwoven laminate according to the invention. According to a particularly preferred embodiment of the invention, both the first spunbond nonwoven layer and the second spunbond nonwoven layer have crimped multicomponent filaments or crimped bicomponent filaments. It is within the scope of the invention that the first spunbond nonwoven layer consists or substantially consists of crimped multicomponent filaments or crimped bicomponent filaments. Furthermore, it is within the scope of the invention that the second outermost spunbond nonwoven layer consists or substantially consists of crimped multicomponent filaments or of crimped bicomponent filaments.

According to the invention, crimped continuous filaments are used in the first layer and preferably also in the further second layer of the spunbond nonwoven laminate according to the invention. The continuous filaments expediently have a crimp with at least 1.5, preferably with at least 2.5 and preferably with at least 3 loops per centimeter of their length. A crimp with 1.5 to 3.5, preferably from 1.8 to 3.2 and preferably from 2 to 3 loops per centimeter of the length of the continuous filaments is particularly preferred here. The number of crimp loops and/or crimp bows (loops) per cm length of the continuous filaments is measured in particular according to the Japanese standard JIS L-1015-1981, by counting the crimps under a pretension of 2 mg/den in (1/10 mm), based on the unstretched length of the filaments. A sensitivity of 0.05 mm is used to determine the number of crimp loops. The measurement is expediently carried out using a "Favimat" apparatus from TexTechno, Germany. For this purpose, reference is made to the publication "Automatic Crimp Measurement on Staple Fibers," Denkendorf Colloqium, "Textile Mess- and Prüftechnik," Nov. 9, 1999, Dr. Ulrich Mörschel (in particular page 4, FIG. 4). For this purpose, the filaments or the filament sample are/is removed as a filament ball from the deposit or from the deposit mesh belt before further solidification, and the filaments are separated and measured.

According to a recommended embodiment, the degree of crimp of the filaments of the second layer of the laminate is equal to or less than the degree of crimp of the filaments of the first layer. This embodiment has proven to be particularly advantageous with regard to attaining the object of the invention.

A very recommended embodiment, which is of particular importance in the scope of the invention, is characterized in that the titer of the filaments of the second layer (cover layer) is lower than the titer of the filaments of the first layer. It is recommended that the filaments of the first layer have a titer of more than 1.5 den, preferably of more than 1.6 den and preferably of more than 1.7 den. According to a preferred embodiment of the invention, the titer of the filaments of the first layer of the spunbond nonwoven laminate according to the invention is between 1.5 den and 2.5 den, in particular between 1.6 den and 2.4 den, preferably between 1.7 den and 2.3 den, very preferably between 1.8 den and 2.2 den, and particularly preferably between 2.0 den to 2.2 den. It is within the scope of the invention that the filaments of the second layer have a titer of less than 1.7 den, in particular less than 1.6 den, and, according to a recommended embodiment, a titer of 0.8 up to 1.6 den, in particular from 0.9 den to 1.5 den, and preferably from 1.0 den to 1.3 den. According to a further embodiment of the invention, filaments with a titer of up to 12 den can be used for the first layer. The filaments of the second layer then have a titer of, for example, less than 6 den or 6 den.

It has already been pointed out that, according to a preferred embodiment of the invention, the titer of the filaments of the second outermost layer is lower than the titer of the filaments of the first layer. The difference between the titer of the filaments of the first layer and the titer of the filaments of the second layer is preferably at least 0.2 den, preferably at least 0.3 den, and recommended at most 1.1 den, preferably at most 1.0 den. According to a further embodiment, the difference between the titer of the first layer and the titer of the second layer can be a maximum of 4 den to 6 den. The titer gradient provided according to a preferred embodiment is particularly advantageous in terms of attaining the object of the invention.

The invention is based on the discovery that the spunbond nonwoven laminate according to the invention is a product having high softness and large volume or thickness that nevertheless fulfills all requirements with regard to the strength properties. Above all, the spunbond nonwoven laminate according to the invention has excellent resistance to abrasion and, in this respect, optimal abrasion resistance. The tensile strength in the machine direction (MD) also has very good values, so that the laminate is easy to handle and use. It is particularly important in the scope of the invention that the spunbond nonwoven laminate according to the invention is distinguished by an optimally closed, homogeneous surface. The second layer of the laminate used as the cover layer contributes in particular to this. An excellent surface uniformity of the laminate is achieved and disturbing elevations from the surface or disturbing indentations in the surface can be effectively avoided. At the same time, the laminate surface is not too rough and has optimal sliding properties. It should also be emphasized that the spunbond nonwoven laminate according to the invention can be made without problems at high production speeds and can therefore be made highly productively in a two-beam system or multibeam system. The spunbond nonwoven laminate is characterized by homogeneous deposition and a homogeneous surface, and without any disturbing filament agglomerates that arise in particular from the disadvantageous so-called blow-back effects. It must also be added that the spunbond nonwoven laminate according to the invention can be made in a simple and inexpensive manner and therefore in a cost-effective manner.

The invention is characterized in that a first component on the outer surface of the filaments of the first layer consists or substantially consists of at least one polyolefin and in particular consists of or substantially consists of polyethylene. Above all, polypropylene can also be used as the polyolefin. It is within the scope of the invention that the first component made of a polyolefin provided on the outer surface of the filaments of the first layer has a lower melting point than the second component or than the further component of the filaments of the first layer.

A particularly preferred embodiment of the invention is characterized in that the polyolefin portion or the polyethylene portion of the filaments of the first layer is less than 40% by weight, in particular less than 38% by weight, and preferably less than 35% by weight. It has already been pointed out that the polyolefin of the first component of the filaments of the first layer is preferably polyethylene. It is recommended that the melt flow rate (MFR) of this polyethylene is less than 35 g/10 min, in particular less than 30 g/10 min, preferably less than 25 g/10 min, and very preferably less than 20 g/10 min. If melt flow rates (MFR) are given here and below, these are measured for polypropylene in particular according to ASTM D1238-13 (condition B, 2.16 kg, 230° C.) and for polyethylene according to ASTM D1238-13 at 190° C./2, 16 kg.

A preferred embodiment of the invention is characterized in that the at least one further component or the second component of the filaments of the first layer consists or substantially consists of polypropylene or a polyester. For this further/second component, at least one polypropylene copolymer can also be used instead of polypropylene or in addition to polypropylene and at least one polyester copolymer can also be used instead of the polyester or in addition to the polyester. Polyethylene terephthalate (PET) is particularly suitable as a polyester and PET copolymer (Co-PET) is particularly suitable as a polyester copolymer. However, polybutylene terephthalate (PBT) or polylactide (PLA) can also be used as polyester. Copolymers of these plastics can also be used. A recommended embodiment of the invention is characterized in that the at least one further component or the second component of the filaments of the first layer made of at least one plastic consists or substantially consists of the group "polypropylene, polypropylene copolymer, polyethylene terephthalate (PET), PET copolymer, polybutylene terephthalate (PBT), PBT copolymer, polylactide (PLA), PLA copolymer." A particularly preferred embodiment is characterized in that the first, in particular lower melting, component of the filaments of the first layer consists or substantially consists of polyethylene and that the second, in particular higher melting component, of the filaments of the first layer consists or substantially consists of polypropylene. Another embodiment is characterized in that the first, in particular lower melting, component of the filaments of the first layer consists or substantially consists of polypropylene or polyethylene and that the second, in particular higher melting, component of the filaments of the first layer consists or substantially consists of a polyester and/or of a polyester copolymer. It is also within the scope of the invention that mixtures or blends of the polymers mentioned are used for the components of the filaments of the first layer.

According to a particularly preferred embodiment of the invention, the multicomponent filaments or the bicomponent filaments of the first layer have an eccentric core-sheath configuration. This embodiment has proven particularly useful with regard to attaining the object of the invention. A very recommended embodiment in this context is characterized in that the sheath of the filaments of the first layer having an eccentric core-sheath configuration has a constant thickness d or a substantially constant thickness d over at least 20%, in particular over at least 30%, preferably over at least 40%, preferably over at least 50%, and very preferably over at least 60% and particularly preferably over at least 65% of the filament circumference. Here and below, the thickness d means in particular the average thickness d. This particularly preferred embodiment is explained in more detail below.

If, according to a highly recommended embodiment, the filaments of the first layer have an eccentric core-sheath configuration, it is within the scope of the invention that the lower-melting first component is provided in the sheath of the filaments and the higher-melting at least one second component or the higher melting second component is present in the core of the filaments. According to a first embodiment of the invention, the multicomponent or bicomponent filaments of the first layer have an eccentric core-sheath configuration, the sheath consisting or substantially consisting of polyethylene or of polyethylene and the core consisting or substantially consisting of polypropylene or polypropylene copolymer. According to a second embodiment, the multicomponent or bicomponent filaments of the first layer have an eccentric core-sheath configuration, the sheath consisting or substantially consisting of a polyolefin and/or polyolefin copolymer, in particular of polypropylene and/or polypropylene copolymer, and wherein the core consists or substantially consists of a polyester and/or a polyester copolymer, in particular of polyethylene terephthalate (PET) and/or PET copolymer. The eccentric core-sheath configuration described above with a constant sheath thickness d is particularly preferred.

If the second component of the filaments of the first layer consists or substantially consists of polypropylene and/or polypropylene copolymer, the polypropylene or the polypropylene copolymer expediently has a melt flow rate (MFR) of more than 25 g/10 min, in particular more than 30 g/10 min, preferably more than 45 g/10 min, preferably more than 55 g/10 min, and particularly preferably more than 60 g/10 min. The melt flow rate (MFR) of the polypropylene or the polypropylene copolymer can be adjusted by additives, in particular by polymer additives, peroxide or the like.

According to the invention, at least a first layer or a first component on the outer surface of the filaments of the second layer (cover layer) consists or substantially consists of at least one polyolefin, in particular polyethylene. According to the invention, this proportion of polyolefin or polyethylene of the first component of the filaments of the second layer is greater than the polyolefin portion or polyethylene portion of the first component of the filaments of the first layer. The polyolefin portion, in particular the polyethylene portion of the filaments of the second layer, is preferably more than 33% by weight, suitably more than 35% by weight, and preferably more than 38% by weight. An embodiment of the invention is characterized in that the polyolefin portion, in particular the polyethylene portion of the filaments of the second layer, is preferably 38% by weight to 67% by weight, in particular 40% by weight to 65% by weight, and preferably 40% by weight to 60% by weight. It is recommended that these weight percentages relate to the lower melting first component of the filaments of the second layer.

A recommended embodiment of the invention is characterized in that the first component on the outer surface of the filaments of the second layer consists of polyethylene or substantially consists of polyethylene. The melt flow rate (MFR) of this polyethylene is expediently greater than 15 g/10 min, in particular greater than 20 g/10 min and preferably greater than 27 g/10 min. If, according to a preferred embodiment of the invention, the first component on the outer surface of the filaments of both layers consists or substantially consists of polyethylene, the melt flow rate of the polyethylene of the filaments of the second layer is expediently greater than the melt flow rate of the polyethylene of the filaments of the first layer.

According to the invention, the at least one further or a second component of the filaments of the second layer consists or substantially consists of a plastic having a higher melting point than the polyolefin or than the polyethylene of the first component of the filaments of the second layer. A particularly preferred embodiment of the invention is characterized in that the at least one further or the second component of the filaments of the second layer consists or substantially consists of polypropylene and/or polypropylene copolymer. In principle, this component can also consist or substantially consist of at least one polyester and/or polyester copolymer. For this purpose, the polyesters or polyester copolymers specified above for the second component of the filaments of the first layer can preferably be used.

If, according to a preferred embodiment, polypropylene is used for the second component of the filaments of the second layer, the melt flow rate (MFR) of this polypropylene of the second component of the second layer is preferably more than 25 g/10 min and in particular more than 50 g/10 min. It is within the scope of the invention that the multicomponent filaments or the bicomponent filaments of the second layer have an eccentric core-sheath configuration or a side-by-side configuration. An eccentric core-sheath configuration of these filaments is particularly preferred. A very particularly recommended embodiment of the invention is characterized in that the multicomponent filaments or the bicomponent filaments of the second layer have an eccentric core-sheath configuration and that the sheath of the filaments has a constant thickness d or a substantially constant thickness d over at least 20%, in particular over at least 30%, preferably over at least 40%, preferably over at least 50%, and very preferably over at least 60% and particularly preferably over at least 65% of the filament circumference.

The invention is based on the discovery that the second layer (cover layer or cover layer) of the spunbond nonwoven laminate according to the invention is responsible, in particular, for the homogeneous surface properties of the laminate. The features of this second layer according to the invention require a high degree of softness and sufficient strength as well as a closed surface. This second layer (cover layer) particularly preferably forms the outer surface of the product when the spunbond nonwoven laminate according to the invention is used in a product. This second layer or surface layer meets all requirements from an aesthetic point of view and contributes to the spunbond nonwoven laminate having excellent opacity. In particular, the second layer forming the cover layer has very homogeneous surface properties without defect sites and above all without disruptive agglomerates.

According to a particularly preferred embodiment of the invention, the first layer and the second layer of the spunbond nonwoven laminate according to the invention are provided directly on top of one another without the interposition of further layers or layers. According to another embodiment, further layers or layers, for example further spunbond nonwoven layers and/or meltblown nonwoven layers, can also be interposed between the first and the second layer.

According to a recommended embodiment of the invention, the basis weight of the second layer is less than the basis weight of the first layer. The basis weight of the first layer is preferably greater than the basis weight of the second layer by at least a factor of 1.1, in particular at least by a factor of 1.2, and preferably at least by a factor of 1.25. It is within the scope of the invention that the basis weight of the (total) spunbond nonwoven laminate is less than 40 g/m².

A particularly preferred embodiment of the invention is characterized in that the strength of the spunbond nonwoven laminate in the machine direction (MD) is greater than 25 N/5 cm. The thickness of the spunbond nonwoven laminate is expediently more than 0.50 mm, in particular more than 0.53 mm, preferably more than 0.55 mm, and particularly preferably more than 0.58 mm. The strength and thickness values given above apply in particular to spunbond nonwoven laminates with a basis weight of 12 to 50 g/m², preferably 20 to 30 g/m².

According to the invention, the at least two layers of the spunbond nonwoven laminate according to the invention are made as spunbond nonwoven layers. It is within the scope of the invention that each of the at least two nonwoven layers is made with a spunbonding device or with a spunbonding beam. In this respect, at least one two-beam system having two spunbonding devices is required to produce the spunbond nonwoven laminate according to the invention. It is within the scope of the invention that each spunbonding device has a spinning apparatus or spinneret as well as a cooler downstream of the spinneret and at least one stretcher downstream of the cooler. At least one diffuser is preferably provided downstream of the stretcher. A very particularly recommended embodiment of the invention is characterized in that the assembly of the cooler and the stretcher is designed as a closed subassembly and that, apart from the supply of cooling air to the cooler, there is no further external air supply to this assembly. The continuous filaments leaving the diffuser or the last diffuser in the flow direction of the filaments are expediently deposited on a deposit conveyor or in particular on a deposit mesh belt. The preconsolidation of each nonwoven layer or spunbond nonwoven layer is then preferably carried out on the deposit conveyor or on the deposit mesh belt.

A particularly recommended embodiment of the invention is characterized in that at least one of the two layers of the spunbond nonwoven laminate is preconsolidated with hot air from above and in particular is only preconsolidated with hot air. An embodiment in which the at least two layers of the spunbond nonwoven laminate according to the invention are preconsolidated with hot air or both layers are only preconsolidated with hot air has proven particularly useful in the scope of the invention. It is also within the scope of the invention that the final consolidation of the spunbond nonwoven laminate takes place with hot air and, according to one embodiment of the invention, takes place only with hot air. The spunbond nonwoven laminate is then a spunbond nonwoven laminate that is only preconsolidated and finally consolidated with hot air. This embodiment is of particular importance in the scope of the invention.

A proven embodiment of the invention is characterized in that at least one layer, preferably both layers, of the spunbond nonwoven laminate according to the invention are each preconsolidated at a temperature below 150° C., in particular at a temperature below 140° C., and preferably at a temperature below 135° C. It is particularly preferred within the scope of the invention that at least one layer, preferably both layers, of the spunbond nonwoven laminate is preconsolidated with a hot air knife and/or with a hot air oven. According to one embodiment variant, the hot air knife forms the first preconsolidater in the travel direction of the layer and then the hot air oven forms the second preconsolidater downstream in the travel direction of the layer. Basically, only a hot air knife or just a hot air oven can be used for the preconsolidation of a layer of the spunbond nonwoven laminate. It is also possible that the first preconsolidater is formed by the hot air oven and the second preconsolidater downstream in the travel direction is formed by the hot air knife. The spunbond nonwoven according to the invention is expediently finally consolidated by hot air and preferably finally consolidated in a hot air oven.

An embodiment that is of particular importance in the scope of the invention is characterized in that the second layer (cover layer) of the spunbond nonwoven laminate according to the invention is made by means of a spunbonding device and is first deposited on the deposit conveyor or on the deposit mesh belt, and after that the first layer is made with a spunbonding device and is applied to the second layer (cover layer) already deposited on the deposit conveyor or on the deposit mesh belt. It has been shown that particularly advantageous products or spunbond nonwoven laminates are obtained in this way.

To attain the inventive object, the invention further teaches a method of making a spunbond nonwoven laminate having a plurality of spunbond nonwoven layers one atop the other, at least two of the spunbond nonwoven layers having crimped continuous filaments or consisting or consisting substantially of crimped continuous filaments, wherein a first spunbond nonwoven layer having crimped multicomponent or bicomponent filaments is made, and at least one first component on the outer surface of the filaments of the first layer consists or substantially consists of at least one polyolefin, in particular of polyethylene, while at least one further or a second component of the filaments of the first layer consists or substantially consists of a plastic having a higher melting point than the polyolefin or polyethylene of the first component of the filaments of the first layer, the first layer is preconsolidated, preferably preconsolidated with hot air, in particular only preconsolidated with hot air, a second outermost spunbond nonwoven layer is made with multicomponent or bicomponent filaments, especially with crimped multicomponent or bicomponent filaments as a cover layer, and at least one first component made of at least one polyolefin, in particular, on the outer surface of the filaments of the second layer consists or substantially consists of polyethylene, while at least one further or a second component of the filaments of the second layer consists or substantially consists of a plastic having a higher melting point than the polyolefin or polyethylene of the first component of the filaments of the second layer, the second spunbond nonwoven layer is preconsolidated, preferably preconsolidated with hot air, in particular is only preconsolidated with hot air, the polyolefin portion or polyethylene portion of the first component of the filaments of the second layer is greater than the polyolefin portion or polyethylene portion of the first component of the filaments of the first layer, and the spunbond nonwoven laminate is finally consolidated, preferably is finally consolidated with hot air, in particular is only finally consolidated with hot air.

A particularly recommended embodiment of the method according to the invention is characterized in that the second outermost spunbond nonwoven layer is first made or deposited on a conveyor and then is preconsolidated, preferably is preconsolidated with hot air and in particular is only preconsolidated with hot air, and the first layer is then generated and deposited on the second layer already deposited, the second layer or the aggregate from the first and second layers then being preconsolidated, preferably preconsolidated with hot air, and in particular only preconsolidated with hot air, and the spunbond nonwoven laminate is finally consolidated, preferably finally consolidated with hot air, and in particular is finally only consolidated with hot air.

BRIEF DESCRIPTION OF THE DRAWING

The above and other objects, features, and advantages will become more readily apparent from the following description, reference being made to the accompanying drawing in which:

FIG. 2 is a schematic side view of a two-beam system with two spunbonding devices for making two layers of a spunbond nonwoven laminate according to the invention;

FIG. 3 is a section through a spunbond nonwoven laminate according to the invention; and FIG. 4 is a section through a continuous filament preferably used according to the invention with an eccentric core-sheath configuration.

SPECIFIC DESCRIPTION OF THE INVENTION

Figure 1:
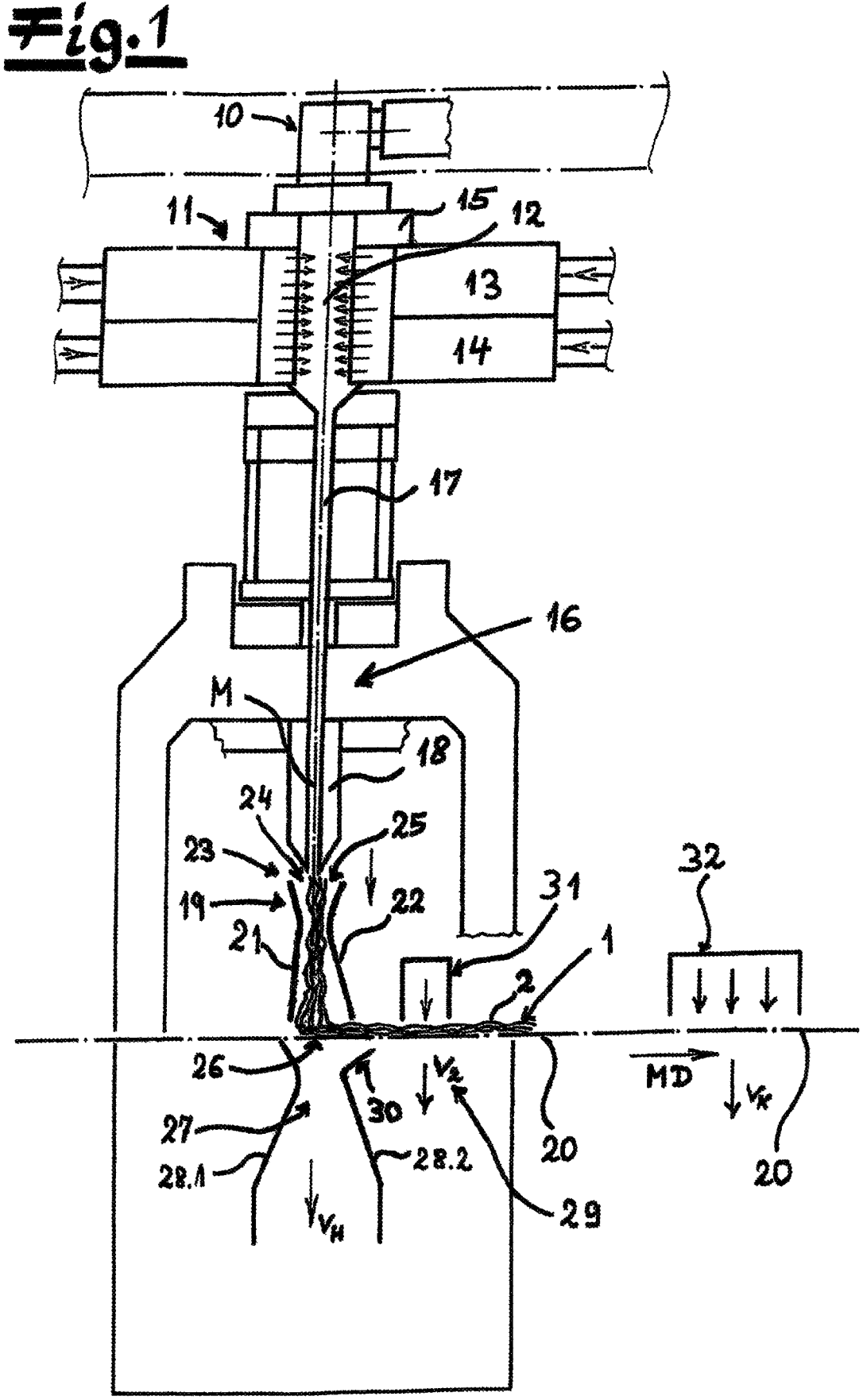
FIG. 1 is a vertical section through an apparatus for making a layer of a spunbond nonwoven laminate according to the invention.

FIG. 1 shows a spunbonding device for making a spunbond nonwoven layer 2 or 3 for an inventive spunbond nonwoven laminate 1. Such a spunbond nonwoven layer 2 or 3 made with the apparatus has crimped continuous filaments F or consists of crimped continuous filaments F, or substantially consists of crimped continuous filaments F. It is within the scope of the invention that the continuous filaments F are thermoplastic.

The apparatus shown in FIG. 1 comprises a spinneret 10 for spinning the continuous filaments F and these spun continuous filaments F are expediently introduced into a cooler 11 with a cooling chamber 12. Preferably, air supply manifolds 13 and 14 are one atop the other on two opposite sides of the cooling chamber 12. Air of different temperatures is expediently introduced into the cooling chambers from these air supply manifolds 13 and 14. As recommended, a monomer extractor 15 is provided between the spinneret 10 and the cooler 11. With this monomer extractor 15, disruptive gases occurring during the spinning process can be removed from the apparatus. These gases can be, for example, monomers, oligomers, or decomposition products and the like substances.

The cooler 11 preferably and, in the embodiment in the filament flow direction, is followed by a stretcher 16 for stretching the continuous filaments F. Preferably, the stretcher 16 has an intermediate passage 17 that connects the cooler 11 to a stretching shaft 18 of the stretcher 16. According to a particularly preferred embodiment, the assembly from the cooler 11 and the stretcher 16 or the assembly from the cooler 11, the intermediate passage 17, and the stretching shaft 18 is designed as a closed subassembly and, apart from the supply of cooling air in the cooler 11, there is no further air supply from outside in this aggregate.

The stretcher 16 is preferably in this embodiment in the filament flow direction by a diffuser 19 through which the continuous filaments F are passed. After passing through the diffuser 19, the continuous filaments F are preferably, deposited on a conveyor designed as a deposit mesh belt 20. The deposit mesh belt 20 is preferred and, in the embodiment, is designed as an endlessly rotating deposit mesh belt 20. This deposit mesh belt 20 is expediently air-permeable so that process air can be aspirated from below through the deposit mesh belt 20.

Preferably, the diffuser 19 has two lower diverging upstream and downstream diffuser walls 21 and 22. These diverging diffuser walls 21 and 22 are expediently asymmetrical with respect to the center plane M of the apparatus or the diffuser 19. As recommended, the upstream diffuser wall 21 forms a smaller angle ß with the center plane M than the downstream diffuser wall 22. The angle ß that the upstream diffuser wall 21 forms with the center plane M is recommended to be at least 1° smaller than the angle ß that the downstream diffuser wall 22 forms with the center plane M.

It is within the scope of the invention that two opposite secondary air inlet gaps 24 and 25 are provided at the inflow end 23 of the diffuser 19, each of which is formed in part by a respective one of the two opposite diffuser walls. A smaller secondary air volume flow can preferably be introduced through the upstream secondary air inlet gap 24 than through the downstream secondary air inlet gap 25. It is recommended that the secondary air volume flow of the upstream secondary air inlet gap 24 is at least 5%, preferably at least 10% and in particular at least 15% lower than the secondary air volume flow through the downstream secondary air inlet gap 2.

FIG. 2 shows a two-beam system with two spunbonding devices corresponding to FIG. 1 for making two spunbond nonwoven layers 2 and 3 to form a spunbond nonwoven laminate 1 according to the invention. For the sake of simplicity, the apparatus components of the spunbonding devices have not been shown in full in FIG. 2, but only the lower region of the respective diffusers 19. According to a particularly preferred embodiment, continuous filaments F are first spun with the upstream spunbonding device for the two-beam system and deposited to form the second spunbond nonwoven layer 3 (cover layer). Continuous filaments F for the first spunbond nonwoven layer 2 are then spun with the spunbonding device downstream in the travel direction of the deposit mesh belt 20 on the right in FIG. 2 and deposited on the deposit mesh belt 20 or on the second spunbond nonwoven layer 3. This order of production of the spunbond nonwoven layers 2, 3 is particularly recommended in the scope of the invention.

Below the deposit region 26 for the continuous filaments F of each spunbonding device, process air is extracted through the deposit mesh belt 20 in a main suction area 27, with a suction velocity $v_H$. The nonwoven layer [2,] 3 made with the first spunbonding device shown on the left in FIG. 2, preferably and here the second layer 3, is recommended to be supplied to the hot-air preconsolidaters with the deposit mesh belt 20. Preferably, this second layer 3 is first preconsolidated with a hot air knife 31 and then preferably further consolidated with a hot air oven 32 connected downstream in the machine direction (MD). In the recommended embodiment, process air is extracted by the deposit mesh belt 20 both below the hot air knife 31 and below the hot air oven 32, specifically in the case of the hot air knife 31 with a suction velocity $v_2$ and in the case of the hot air oven with a suction velocity $v_3$. For the suction velocities, it is preferably the case that the suction velocity $v_H$ is greatest in the main suction area 27 and the suction velocity $v_2$ under the hot air knife 31 is the second largest and that the suction velocity $v_3$ under the hot air oven 32 is the third largest. The suction velocity v thus decreases from the deposit region 26 of the filaments F to the hot air oven 32. The hot air knife 31 (left in FIG. 2) preferably preconsolidates the second layer 3 at a hot air temperature of 80° C. to 250° C., preferably at 120° C. to 190° C. The hot-air preconsolidation in the downstream hot air oven 32 is advantageously carried out at a hot air temperature of 110° C. to 180° C., preferably from 120° C. to 160° C. The hot air knife 31 (left in FIG. 2) is preferred and, in the embodiment, hot air is supplied at a higher speed than the hot air of the downstream hot air oven 32. The speed of the supplied hot air in the hot air knife 31 preferably has a speed that is greater by at least a factor of 1.5, preferably a factor of 1.8, than the speed of the hot air in the hot air oven 32. Furthermore, as recommended, the width in the machine direction (MD) in which hot air is applied is narrower for the first (in FIG. 2 left) hot air knife 31 than for the first (in FIG. 2 left) hot air oven 32. The width of the hot air exposure in the machine direction (MD) in the hot air oven 32 is larger by at least a factor of 1.5 than in the hot air knife 31.

A second spunbond nonwoven layer 2, 3, preferably and here the first layer 2, for the spunbond nonwoven laminate 1 is made with the right second spunbonding device shown in FIG. 2. This first layer 2 is recommended and, in the embodiment, deposited on the second spunbond nonwoven layer 3 already transported by the deposit mesh belt 20. Subsequently, it is preferred and here the aggregate from two layers 2, 3 is preconsolidated, specifically as recommended and here preconsolidated with hot air. For this purpose, a hot air knife 31 is first downstream of the second spunbonding device in the machine direction (MD) and a hot air oven 32 is in turn downstream of the hot air knife 31. In the case of the second spunbonding device and in the aforementioned hot-air preconsolidaters of the second spunbonding device, the suction operations explained for the first spunbonding device are expediently carried out with the corresponding suction velocities. The parameters mentioned there for the hot-air preconsolidaters, in particular temperatures and width parameters, also apply to the hot air knife 31 and to the hot air oven 32 behind the second spunbonding device. In the embodiment of FIG. 2, both layers 2, 3 of the spunbond nonwoven laminate 1 according to the invention are only preconsolidated with hot air.

It is within the scope of the invention that the preconsolidated aggregate from the two layers 2 and 3 is then finally consolidated, and is preferably finally consolidated by means of hot air. For this purpose, a hot air oven, not shown in the figures, is expediently used. According to one embodiment of the invention, the layers or the two layers 2, 3 of the spunbond nonwoven laminate 1 are both preconsolidated with hot air or only preconsolidated with hot air and also finally consolidated with hot air or only finally consolidated with hot air.

FIG. 3 schematically shows a section through an inventive spunbond nonwoven laminate 1 with the two layers 2 and 3.

FIG. 4 shows bicomponent filaments with an eccentric core-sheath configuration, which are very particularly preferred for the layers 2, 3 of the spunbond nonwoven laminate 1 according to the invention. According to one embodiment of the invention, both layers 2, 3 of the spunbond nonwoven laminate 1 consist of such bicomponent filaments with an eccentric core-sheath configuration. FIG. 4 shows a cross section through a continuous filament F with the preferred special core-sheath configuration. With these continuous filaments F, the sheath 37 preferably has a constant thickness d in the filament cross section and here over more than 50%, preferably over more than 55% of the filament circumference. Preferably, the core 4 of the filaments F takes up more than 65% of the area of the filament cross section of the filaments F. As recommended, the core 4, seen in the filament cross section, is designed in the shape of a segment of a circle. Expediently, this core 4 has an arcuate peripheral portion 5 and a secantal peripheral portion 6 with regard to its circumference. Preferably, the arcuate peripheral portion of the core 4 takes up over 50%, preferably over 55% of the circumference of the core 4. Expediently, the sheath 37 of the filaments F, seen in the filament cross section, is formed in the shape of a segment of a circle outside the sheath region with a constant thickness d. This circular segment 7 of the sheath 37 has, as recommended, an arcuate peripheral portion 8 and a straight peripheral portion 9 with regard to its circumference. The thickness d or the average thickness d of the sheath 37 in the region of its constant thickness is preferably 0.5% to 8%, in particular 2% to 10% of the filament diameter D. The thickness d or the average thickness d of the sheath is preferably 0.1 µm to 3 µm. FIG. 4 also shows the distance a of the center of gravity of the core 4 from the centroid of the sheath 3 of the continuous filament 2. The distance a between the centroid of the core 4 and the centroid of the sheath 3 is preferably 5% to 40% of the filament diameter D or the largest filament diameter D for the filaments F here.

The invention claimed is:

1. A spunbond nonwoven laminate comprising:
   a first spunbond nonwoven layer having crimped multicomponent or bicomponent filaments formed by
      a first component on an outer surface of the filaments of the first layer consisting or substantially consisting of a polyolefin, and
      a second component consisting or substantially consisting of a plastic having a higher melting point than the polyolefin of the first component of the filaments of the first layer; and
   a second outermost spunbond nonwoven layer on the first layer having multicomponent or bicomponent filaments as a cover layer and formed by
      a first component on an outer surface of the filaments of the second layer consisting or substantially consisting of a polyolefin, and
      a second component consisting or substantially consisting of a plastic having a higher melting point than the polyolefin of the first component of the filaments of the second layer, a polyolefin portion of the first component of the filaments of the second layer being greater than a polyolefin portion of the first component of the filaments of the first layer, a degree of crimp of the filaments of the second layer being equal to or less than a degree of crimp of the filaments of the first layer.

2. The spunbond nonwoven laminate according to claim 1, wherein a titer of the filaments of the second outermost layer is less than a titer of the filaments of the first layer.

3. The spunbond nonwoven laminate according to claim 1, wherein the second component of the filaments of the first layer consists or substantially consists of polypropylene or polyester.

4. The spunbond nonwoven laminate according to claim 1, wherein the polyolefin portion of the filaments of the first layer is less than 40% by weight.

5. The spunbond nonwoven laminate according to claim 1, wherein the filaments of the first layer have a titer of 1.5 den to 2.5 den.

6. The spunbond nonwoven laminate according to claim 1, wherein the polyolefin of the first component of the filaments of the first layer is polyethylene having a melt flow rate of less than 35 g/10 min.

7. The spunbond nonwoven laminate according to claim 1, wherein the second component of the filaments of the first layer consists or substantially consists of polypropylene having a melt flow rate of more than 25 g/10 min.

8. The spunbond nonwoven laminate according to claim 1, wherein the multicomponent or bicomponent filaments of the second spunbond nonwoven layer are crimped filaments.

9. The spunbond nonwoven laminate according to claim 1, wherein the second component of the filaments of the second layer consists or substantially consists of polypropylene.

10. The spunbond nonwoven laminate according to claim 1, wherein the polyolefin portion of the filaments of the second layer is 40 wt. % to 65 wt. %.

11. The spunbond nonwoven laminate according to claim 1, wherein the filaments of the second layer have a titer of less than 1.7 den.

12. The spunbond nonwoven laminate according to claim 1, wherein the multicomponent or bicomponent filaments of the second layer have an eccentric core-sheath configuration or a side-by-side configuration.

13. The spunbond nonwoven laminate according to claim 1, wherein the first component on the outer surface of the filaments of the second layer consists or substantially consists of polyethylene having a melt-flow rate greater than 15 g/10 min.

14. The spunbond nonwoven laminate according to claim 9, wherein the melt flow rate of the polypropylene of the second component of the second layer is more than 25 g/10 min.

15. The spunbond nonwoven laminate according to claim 1, wherein a weight per unit area of the second layer is less than a weight per unit area of the first layer.

16. The spunbond nonwoven laminate according to claim 1, wherein a basis weight of the spunbond nonwoven laminate is less than 30 g/m².

17. The spunbond laminate according to claim 1, wherein a strength of the spunbond nonwoven laminate in a machine direction is greater than 25 N/5 cm, the spunbond nonwoven laminate having a basis weight of 12 to 50 g/m².

18. The spunbond laminate according to claim 1, wherein a thickness of the spunbond nonwoven laminate is more than 0.50 mm, and the spunbond nonwoven laminate has a basis weight from 12 to 50 g/m².

19. The spunbond nonwoven laminate according to claim 1, wherein a difference between a titer of the filaments of the first layer and a titer of the filaments of the second layer is at least 0.2 den.

20. The spunbond laminate according to claim 1, wherein crimped multicomponent or bicomponent filaments are used for the filaments of the second spunbond nonwoven layer.

21. A spunbond nonwoven laminate comprising:
a first spunbond nonwoven layer having crimped multicomponent or bicomponent filaments in an eccentric core-sheath configuration and formed by
a first component on an outer surface of the filaments of the first layer consisting or substantially consisting of a polyolefin, and
a second component consisting or substantially consisting of a plastic having a higher melting point than the polyolefin of the first component of the filaments of the first layer; and
a second outermost spunbond nonwoven layer on the first layer having multicomponent or bicomponent filaments as a cover layer and formed by
a first component on an outer surface of the filaments of the second layer consisting or substantially consisting of a polyolefin, and
a second component consisting or substantially consisting of a plastic having a higher melting point than the polyolefin of the first component of the filaments of the second layer, a polyolefin portion of the first component of the filaments of the second layer being greater than a polyolefin portion of the first component of the filaments of the first layer, sheaths of the filaments of the first layer having over at least 20% of their circumferences a substantially constant thickness d.

22. A spunbond nonwoven laminate comprising:
a first spunbond nonwoven layer having crimped multicomponent or bicomponent filaments formed by
a first component on an outer surface of the filaments of the first layer consisting or substantially consisting of a polyolefin, and
a second component consisting or substantially consisting of a plastic having a higher melting point than the polyolefin of the first component of the filaments of the first layer; and
a second outermost spunbond nonwoven layer on the first layer having multicomponent or bicomponent filaments as a cover layer and formed by
a first component on an outer surface of the filaments of the second layer consisting or substantially consisting of a polyolefin, and
a second component consisting or substantially consisting of a plastic having a higher melting point than the polyolefin of the first component of the filaments of the second layer, a polyolefin portion of the first component of the filaments of the second layer being greater than a polyolefin portion of the first component of the filaments of the first layer, the multicomponent filaments or the bicomponent filaments of the second layer having an eccentric core-sheath configuration and the sheaths of the filaments having a constant thickness d or a substantially constant thickness d over at least 20% of a filament circumference.

* * * * *